April 13, 1954     B. J. GELLINGS     2,674,823
SPINNER FISH LURE
Filed Sept. 21, 1951
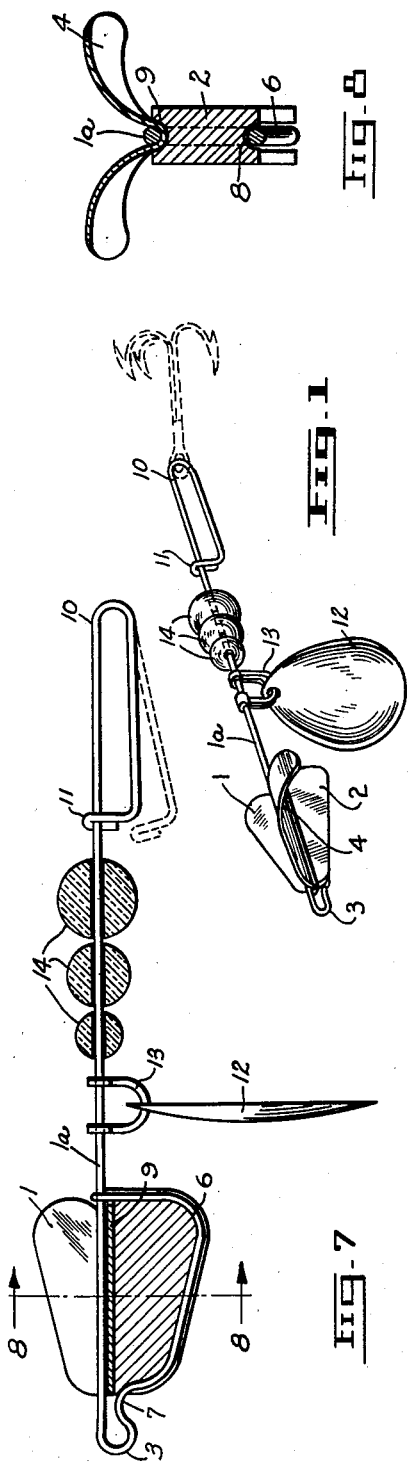
INVENTOR
Bernard J. Gellings
Ralph Burch
Attorney Patented Apr. 13, 1954

2,674,823

UNITED STATES PATENT OFFICE 2,674,823

SPINNER FISH LURE

Bernard J. Gellings, Brooks, Alberta, Canada

Application September 21, 1951, Serial No. 247,591

3 Claims. (Cl. 43—42.39)

This invention relates generally to a fish lure, and in particular, to an improvement in spinner spoon type lures.

An object of the invention is the provision of a lure having a shank in which a weight and wings are mounted to prevent the lure from spinning, the weight acting as a rudder for stabilizing the assembly, and a spinner spoon mounted on the shank in a freely rotatable manner.

Another object of the invention is to provide a single unit which will not have a tendency to jackknife and become entangled, which is common in fish lures which are weighted separately, thus permitting greater range of cast, more accuracy, and depth control.

Another object of this invention is the provision of a lure having a weight, and wings so disposed, and designed that the lure is deflected from, and avoids obstructions by having a reducing taper disposed toward the forward portion of the lure.

Another object of this invention is the provision of a lure which is simple in construction, efficient in use, easily assembled and disassembled so that broken, or lost parts may readily be replaced, and economical to manufacture.

With these and other objects, and advantages in view as may appear while the description proceeds, the invention consists in the novel arrangement of co-operating parts shown in the accompanying drawings forming part of this application and in which:

Figure 1 illustrates in perspective, a view of my improved spinner type fish lure;

Figure 2 is a side elevation of the shank, showing the connecting loops;

Figure 3 is a view in perspective of the wing arrangement;

Figure 4 is a perspective view of the stabilizing weight showing the grooved construction for connection with the shank;

Figure 5 is a view of the weight similar to Figure 4, showing the groove in the under part;

Figure 6 is a front elevational view of the wing construction;

Figure 7 is an enlarged side view of the assembly in section, showing clearly the arrangement of the various parts, and Figure 8 shows a cross sectional view taken on the line 8—8 of Figure 7.

Referring now in detail to the drawings, in which similar reference characters designate corresponding parts throughout the several views, Figure 1 shows a perspective view of the complete assembly, comprising a wing arrangement 1, and a stabilizing weight 2, mounted on a wire shank 1a, said shank being bent at its forward end into an angular loop 6, terminating in a hook 5 for detachable assembly with shank 1a, said shank being provided with a loop 10, at its rear extremity for attaching a hook, said loop 10 being detachably connected to the shank at 11.

The angular loop 6 is provided with a portion 3, at its forward end, adapted to receive a line or cast attached to a fishing rod, and a bent up portion 7, adapted to retain the stabilizing weight 2, securely on the shank 1a, said weight 2, being provided with grooves 8, into which the wire shank fits, the lower portion 9, of wings 1, being retained between the shank 1a, and weight 2, as shown clearly in the sectional Figure 8. The wings 1, are flared upwardly at 4, to provide greater water resistance, and thus tend to cause the lure to rise in the water. A spoon, or spinner 12, is rotatably attached to the shank intermediate its ends by means of a U-shaped clevis 13, and additional weights or coloured transparent balls 14 may be attached to the shank 1a, as desired for sinking the lure to a required depth in the water as clearly shown in Figures 1 and 7.

Without further detailed description, it will be seen that I have provided an attractive, and efficient lure, for trolling, or casting, which may be easily assembled and disassembled, having few parts, and inexpensive to manufacture.

Other changes and modifications in the form and relative parts, which will be apparent to those skilled in the art, may be made without departing from the spirit and scope of the invention, as set forth in the appended claims.

I claim:

1. A device of the character described comprising a shank having one end reversely bent and extending in diverging relation to the shank to form a spring clamping arm, the free end of the clamping arm being bent inwardly towards the shank and provided with a hook terminal for engagement with the shank, a weight adapted to be received between the shank and clamping arm having a straight edge with a groove to receive the shank and an inclined edge with a groove to receive the clamping arm, and a wing plate having a V-shape body disposed between the shank and weight and seated in the groove of the straight edge of the weight, said wing plate having laterally extending curved wings.

2. A device of the character described comprising a shank bent back on itself at one end to form a loop, said loop having a hook for detachably securing one end of the loop to said shank, the opposite end of said shank being bent back on itself to form an angular loop provided with a hook terminal for engagement with said shank, a weight element conforming to the shape of said angular loop and supported by said angular loop on said shank, and a wing element disposed between said weight and said shank, said angular loop rearwardly of its forward end being bent upwardly to press against said weight and clamp said wing element in position.

3. A device of the character described in claim 2 wherein said weight is provided with a groove forming a seat for said wing element and said angular loop.

References Cited in the file of this patent
UNITED STATES PATENTS

| Number | Name | Date |
|---|---|---|
| 765,482 | Hardy | July 19, 1904 |
| 1,457,926 | Dunkelberger | June 5, 1923 |
| 1,522,451 | Hayes | Jan. 6, 1925 |
| 2,482,648 | Brandt | Sept. 20, 1949 |